United States Patent
Li et al.

(10) Patent No.: US 10,812,160 B2
(45) Date of Patent: Oct. 20, 2020

(54) METHOD AND DEVICE FOR BEAM FORMING

(71) Applicant: Telefonaktiebolaget LM Ericsson (publ), Stockholm (SE)

(72) Inventors: Ming Li, Beijing (CN); Jianfeng Wang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/341,191

(22) PCT Filed: Oct. 13, 2016

(86) PCT No.: PCT/CN2016/102009
§ 371 (c)(1),
(2) Date: Apr. 11, 2019

(87) PCT Pub. No.: WO2018/068265
PCT Pub. Date: Apr. 19, 2018

(65) Prior Publication Data
US 2020/0119789 A1    Apr. 16, 2020

(51) Int. Cl.
*H04B 7/06* (2006.01)
*H04B 7/0404* (2017.01)
*H04B 7/0413* (2017.01)

(52) U.S. Cl.
CPC ......... *H04B 7/0617* (2013.01); *H04B 7/0404* (2013.01); *H04B 7/0413* (2013.01)

(58) Field of Classification Search
CPC ............ H04B 7/0413–0486; H04B 7/08–0897
See application file for complete search history.

(56) References Cited

U.S. PATENT DOCUMENTS

| | | | |
|---|---|---|---|
| 6,208,837 B1* | 3/2001 | Koh | H04W 52/0245 340/7.2 |
| 9,614,487 B2* | 4/2017 | Otaka | H03G 3/3068 |

(Continued)

FOREIGN PATENT DOCUMENTS

| | | |
|---|---|---|
| CN | 1392692 A | 1/2003 |
| CN | 102790662 A | 11/2012 |

(Continued)

OTHER PUBLICATIONS

International Search Report and Written Opinion for International Patent Application No. PCT/CN2016/102009, dated Jul. 20, 2017, 8 pages.

(Continued)

Primary Examiner — Gennadiy Tsvey
(74) Attorney, Agent, or Firm — Patent Portfolio Builders, PLLC

(57) ABSTRACT

Embodiments of the present disclosure relate to a method and device for beam forming. In example embodiments, a plurality of signals are obtained from a plurality of receiving antennas. The plurality of signals are grouped into a first and second set of signals. An automatic gain control (AGC) is disabled for each signal in the first set of signals, and the AGC has been enabled for each signal in the second set of signals. Then, for beam forming associated with the plurality of receiving antennas, beam weights are determined by applying a first set of signal weights to the first set of signals and applying a second set of signal weights to the second set of signals. The first set of signal weights are greater than the second set of signal weights. In this way, negative effects due to the AGC processing may be mitigated in the beam forming.

12 Claims, 3 Drawing Sheets

(56) References Cited

U.S. PATENT DOCUMENTS

| | | | | | |
|---|---|---|---|---|---|
| 2001/0028244 | A1* | 10/2001 | Bhat | ................. | H04N 5/52 |
| | | | | | 324/76.35 |
| 2006/0217094 | A1* | 9/2006 | Ikeda | ............... | H03G 3/3052 |
| | | | | | 330/129 |
| 2008/0090538 | A1* | 4/2008 | Ishiguro | ............ | H03G 3/3052 |
| | | | | | 455/249.1 |
| 2008/0242249 | A1* | 10/2008 | Gomez | ............ | H03G 1/0088 |
| | | | | | 455/234.1 |
| 2009/0124227 | A1* | 5/2009 | Ishiguro | ............... | H04B 1/18 |
| | | | | | 455/249.1 |
| 2009/0310723 | A1* | 12/2009 | Ishiguro | ............ | H03G 3/3052 |
| | | | | | 375/345 |
| 2011/0310883 | A1* | 12/2011 | Takano | ............... | H04B 7/088 |
| | | | | | 370/350 |
| 2016/0173185 | A1* | 6/2016 | Kang | ............... | H04B 7/0608 |
| | | | | | 375/267 |

FOREIGN PATENT DOCUMENTS

| | | | |
|---|---|---|---|
| CN | 104321998 | A | 1/2015 |
| CN | 104854791 | A | 8/2015 |
| EP | 2824855 | A1 | 1/2015 |
| KR | 1020060033612 | A | 4/2006 |
| WO | 2016/003341 | A1 | 1/2016 |

OTHER PUBLICATIONS

Extended European Search Report issued in corresponding EP Application No. 16918704.4 dated Mar. 27, 2020, 05 Pages.

\* cited by examiner

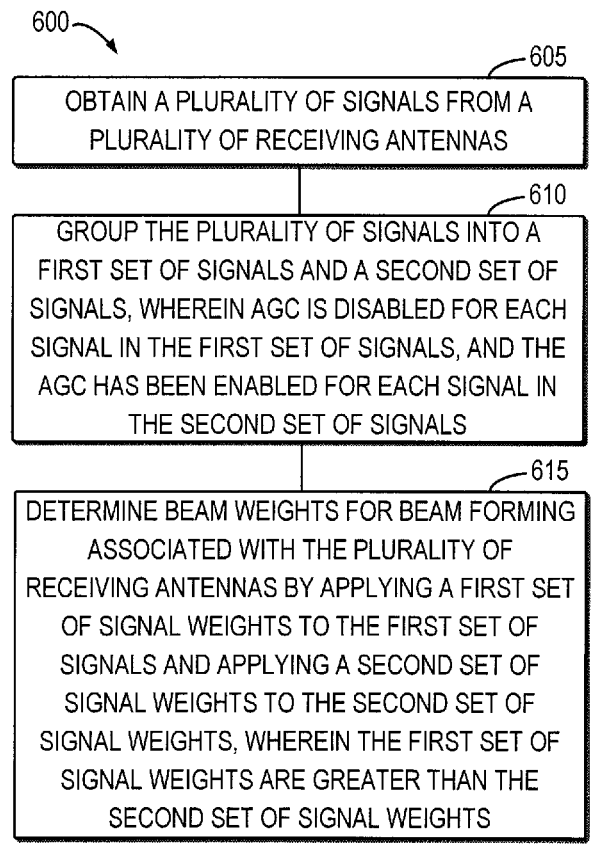
Fig. 6
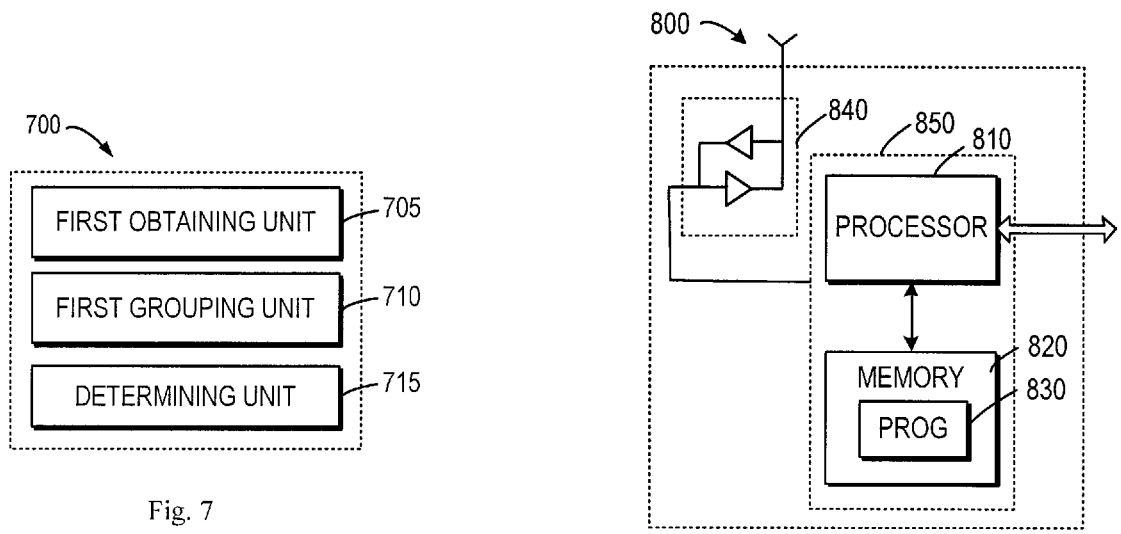
Fig. 7
Fig. 8

METHOD AND DEVICE FOR BEAM FORMING

This application is a 35 U.S.C. § 371 national phase filing of International Application No. PCT/CN2016/102009, filed Oct. 13, 2016, the disclosure of which is incorporated herein by reference in its entirety.

TECHNICAL FIELD

Embodiments of the present disclosure generally relate to the field of telecommunication, and in particular, to a method and device for beam forming.

BACKGROUND

A massive multiple-input multiple-output (MIMO) technology makes use of a very large number of service antennas that are operated coherently and adaptively. Extra antennas facilitate energy concentration of transmitted or received signal into a very small space region. In the case of simultaneous scheduling of a large number (for example, tens or hundreds) of user terminals, this technology brings huge improvements in throughput and energy efficiency. The massive MIMO may also bring other benefits which may include, for example, wider use of inexpensive low-power components, a reduced latency, a simplified media access control (MAC) layer, and improved robustness to interference and intentional jamming. The massive MIMO may be applied in both time division duplex (TDD) and frequency division duplex (FDD) operations.

However, the massive MIMO renders some challenges in terms of the following: effective cooperation of many low-cost low-precision components, efficient acquisition for channel state information, resource allocation for newly-joined terminals, exploitation of extra degrees of freedom provided by excessive service antennas, reductions of total energy efficiency achieved by reducing internal power consumption, and new deployment scenarios.

In a receiver of a base station in the massive MIMO, uplink (UL) beam forming is typically employed to achieve better signal to noise ratio (SNR). By the UL beam forming, an orientation of a transmitter in relation of the receiver may be found, and therefore data transmitted by the transmitter may be detected. Generally, the data may be detected without completion of the whole UL beam forming in all of the beams. That is, only some of beams are required for the beam forming. Accordingly, amount of data to be delivered for the baseband processing may be reduced in the case of a small increase of computation complexity due to the UL beam forming.

In addition, an Automatic Gain Control (AGC) function, which is generally used in a receiver to adjust power levels of received signals into a suitable level, may cause some problems in the massive MIMO. For example, the AGC processing may need additional processing time that extends a normal receiving time period in the receiver. In order to shorten the additional processing time due to the AGC, real time/low latency digital processing resources, such as Field Programmable Gate Array (FPGA) or digital signal processor (DSP) with high capacities, have to be reserved. Moreover, the AGC function may enlarge a size of a printed circuit board (PCB). The needs of the above components may result in lots of hardware costs in the massive MIMO with hundreds of antenna branches.

Furthermore, in the AGC function, rapid changes in the power levels and phases of the signals may cause glitches of signal gains related to the AGC. These glitches may further degrade performance of subsequent baseband processing. For example, if lots of glitches spread in time, efficiency of the receiver may be decreased rapidly, and transmission throughput may be reduced significantly. In some cases, a receiving process of the receiver may be temporarily interrupted or even broken down.

SUMMARY

Generally, the glitches may cause severe problems for the UL beam forming. If one of the antenna branches is affected by the glitches in the AGC adjustment, then after the UL beam forming, all beams and layers may include noises or spurs of the antenna branch, and the SNR may be worsened.

In general, example embodiments of the present disclosure provide a method and device for beam forming.

In a first aspect, a method implemented at a communication device is provided. According to the method, a plurality of signals are obtained from a plurality of receiving antennas. The plurality of signals are grouped into a first set of signals and a second set of signals. An automatic gain control (AGC) is disabled for each signal in the first set of signals, and the AGC has been enabled for each signal in the second set of signals. Then, for beam forming associated with the plurality of receiving antennas, beam weights are determined by applying a first set of signal weights to the first set of signals and applying a second set of signal weights to the second set of signals. The first set of signal weights are greater than the second set of signal weights.

In some embodiments, for a given signal from the plurality of signals, an indication of a triggering of the AGC for the given signal may be detected. In response to the triggering of the AGC being detected, the given signal may be grouped into the second set of signals.

In some embodiments, a power level associated with the given signal is obtained. In response to the power level exceeding a threshold, the given signal is grouped into the second set of signals.

In some embodiments, obtaining a plurality of signals from a plurality of receiving antennas comprises: obtaining one of the plurality of signals from each of the plurality of receiving antennas.

In a second aspect, a communication device is provided. The communication device comprises a first obtaining unit configured to obtain a plurality of signals from a plurality of receiving antennas; a first grouping unit configured to group the plurality of signals into a first set of signals and a second set of signals, wherein an automatic gain control (AGC) is disabled for each signal in the first set of signals, and the AGC is enabled for each signal in the second set of signals; and a determining unit configured to determine beam weights for beam forming associated with the plurality of receiving antennas by applying a first set of signal weights to the first set of signals and applying a second set of signal weights to the second set of signals, wherein the first set of signal weights are greater than the second set of signal weights.

In a third aspect, there is provided an apparatus at a base station. The apparatus comprises a processor and a memory. The memory contains instructions executable by the processor, whereby the apparatus is operative to perform the method according to the first aspect.

In a fourth aspect, there is provided a computer program product that is tangibly stored on a computer readable storage medium. The computer program product includes instructions which, when executed on at least one processor, cause the at least one processor to carry out the method according to the first aspect.

Through the following description, it would be appreciated that according to embodiments of the present disclosure, the beam weights for the beam forming associated with the receiving antenna may be determined considering whether or not to enable the AGC for the received signals. In this way, negative effects due to the AGC processing may be mitigated in the beam forming.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 6 shows a flowchart of an example method in accordance with some other embodiments of the present disclosure;

FIG. 7 shows a block diagram of a communication device 700 in accordance with some embodiments of the present disclosure; and FIG. 8 shows a simplified block diagram of a device that is suitable for implementing embodiments of the present disclosure.

Throughout the drawings, the same or similar reference numerals represent the same or similar element.

DETAILED DESCRIPTION

Figure 1:
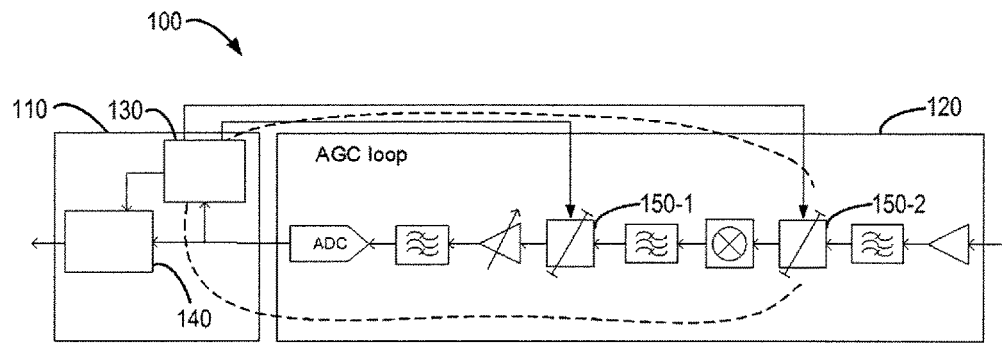
FIG. 1 shows a block diagram of an example radio frequency (RF) front end.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication device" refers to any device capable of transmitting and receiving radio signal in a wireless communication network. Examples of the communication device may include a network device, a terminal device, and the like.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

As used herein, "terminal device" refers to a device capable, configured, arranged and/or operable to communicate wirelessly with network device and/or another terminal device. Communicating wirelessly may involve transmitting and/or receiving wireless signals using electromagnetic signals, radio waves, infrared signals, and/or other types of signals suitable for conveying information through air. In particular embodiments, terminal devices may be configured to transmit and/or receive information without direct human interaction. For instance, a terminal device may be designed to transmit information to a network on a predetermined schedule, when triggered by an internal or external event, or in response to requests from the network. Generally, a terminal device may represent any device capable of, configured for, arranged for, and/or operable for wireless communication, for example radio communication devices. Examples of terminal devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

A terminal device as described above may represent the endpoint of a wireless connection, in which case the device may be referred to as a wireless terminal. Furthermore, a terminal device as described above may be mobile, in which case it may also be referred to as a mobile device or a mobile terminal.

As used herein, the term "wireless communication network" refers to a network following any suitable communication standards and may represent any type of communication, telecommunication, data, cellular, and/or radio network or other type of system, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

As used herein, the singular forms "a", "an" and "the" are intended to include the plural forms as well, unless the context clearly indicates otherwise. The term "includes," "comprises," "comprising," "has," "having," and/or "including" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

As described above, the massive MIMO typically employs the UL beam forming in the receiving processing to achieve better SNR. Processing of the UL beam forming may be expressed as the following equation (1):

$$\tilde{y}_{B\times 1}^{(k)} = W_{B\times T}^{(k)} \cdot y_{T\times 1}^{(k)} \quad (1)$$

where $\tilde{y}_{B\times 1}^{(k)}$ and $y_{T\times 1}^{(k)}$ represent signal vectors on the kth subcarrier in a beam dimension and an antenna dimension, respectively, and the matrix $W_{B\times T}^{(k)}$ represents beam forming weights. After the UL beam forming, signals received at all of antennas would be involved in a signal formed in beams.

The orientation of the transmitter in relation of the receiver may be found by means of the UL beam forming, as described above, to efficiently detect the transmitted data. The detection of the data may be accomplished only after the UL beam forming in some of the beams. Accordingly, the UL beam forming may reduce the amount of data to be delivered for the baseband processing, but induce the small increase of the low computation complexity.

As described above, the AGC function is also used in the receiver to adjust power levels of received signals into a suitable level, and, however, the AGC function may cause some problems in the massive MIMO. FIG. 1 shows an example structure of a radio frequency (RF) front end 100 in a receiver. As shown, the RF front end 100 includes a digital front end 110 and an analog front end 120. The digital front end 110 includes a power meter 130 for measuring a power level of a received signal. The power meter 130 includes a trigger (not shown) for enabling one or more attenuators 150-1 and 150-2 (collectively referred to as "attenuators" 150) in the analog front end 120. If the power level of the received signal is measured to be high (for example, above a threshold level), the trigger enables the attenuators to attenuate the higher power level to a lower power level (for example, below the threshold level). The digital front end 110 also includes a digital power compensator 140 which is used to keep a uniform gain of the receiver.

As described above, the analog front end 120 includes one or more attenuators 150-1 and 150-2 which enable a multilevel attenuation. It is to be understood that two attenuators 150 are shown in FIG. 1 only for the purpose of illustration. In practice, any suitable number of attenuators may be used in the AGC function.

The number of the attenuators triggered for the AGC function depends on the power level of the received signal. For example, the received power level may be divided into multiple levels corresponding to respective AGC states. For the AGC state corresponding to a higher level, more attenuators 150 may be triggered to cause a larger attenuation of the receiving signal.

Figure 2:
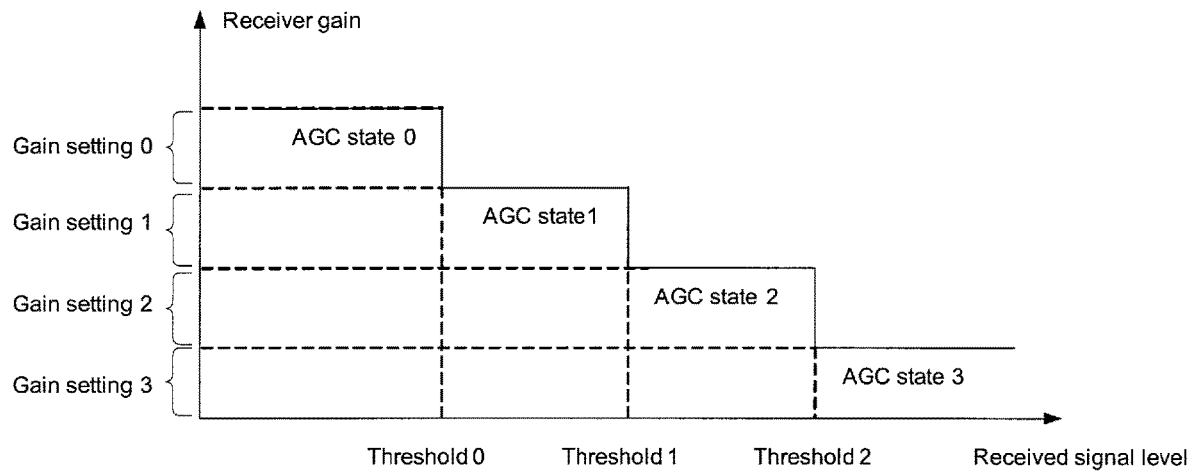
FIG. 2 shows an example AGC attenuation configuration for received power levels.

FIG. 2 shows an example AGC attenuation configuration for received power levels. In this example, as shown, four AGC states are triggered for three threshold power level. Accordingly, four gain settings, including Gain setting 0, Gain setting 1, Gain setting 2, and Gain setting 3. The spread of multiple AGC states may mitigate sensitivity degradation due to a sharp attenuation.

As described above, the use of the AGC function in the receiver may result in inherent drawbacks. For example, feedback mechanism of the AGC function may induce additional reaction time to the normal receiving time period. Conventionally, in order to mitigate negative effects of the feedback mechanism, the FPGAs or DSPs with high capacities are utilized to provide real-time processing or having a low processing latency. These components increase hardware costs of the massive MIMO. Furthermore, the enlargement of the PCBs due to the AGC function may further increase the hardware costs.

In addition, the AGC function may result in rapid changes in the power levels and phases of the received signals, and such changes may cause glitches of the signal gains during transitions through different gain settings or attenuation paths in the receiver. The glitches may degrade the performance of the baseband processing. For example, at least a period of time in an order of milliseconds may be taken to re-stabilize the receiver gains if interferences hit the receiver. Furthermore, the spread of lots of glitches in time may rapidly decrease the receiver efficiency and significantly reduce the transmission throughput and, even worse, may temporarily interrupt or break down the receiving process.

Figure 3:
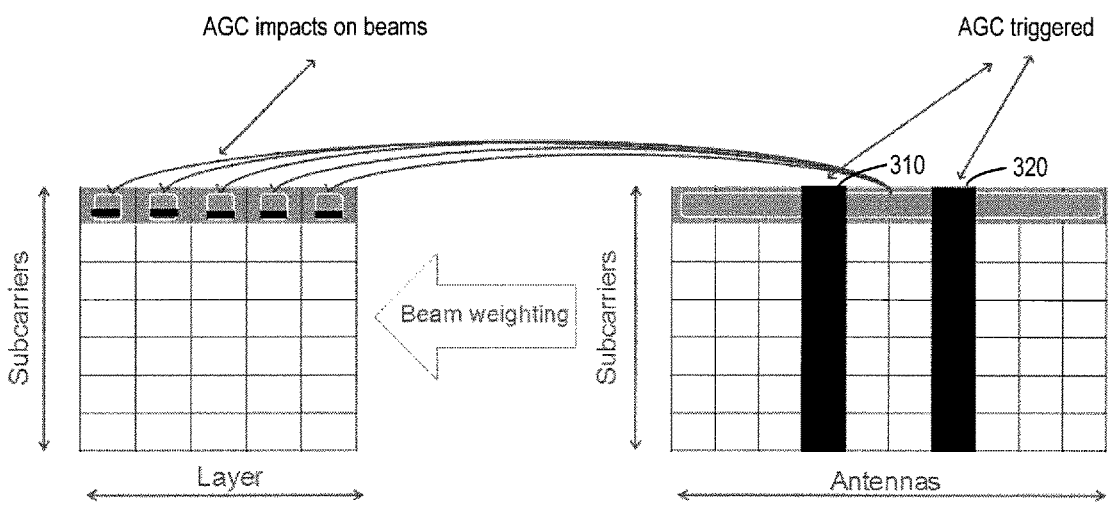
FIG. 3 shows AGC impact on the beam weights for the UL beam forming.

FIG. 3 illustrates AGC impact on the beam weights. As shown, if the AGC function is triggered for the signals received from antennas 310 and 320, the negative effects of the AGC function may be induced into the beam weights for all of the beams (or layers). And, subsequently, the beams are impacted.

In this situation, suppression of the glitches may be implemented in the signal processing. One example method of the suppression is to simply insert zero data instead of samples of the received signals that may be affected by the glitches. However, this method may result in complicated processes in timing alignment to catch the glitches. The resulting processes may be more complicated for the Massive MIMO with a large number of antenna branches.

The inventors found that the AGC function is conventionally a RF operation separated from base band beam forming (BBBF) in the physical layer processing. However, the AGC function may affect chains from the radio front end to code words demodulation. In this case, an optimization method of the BBBF in the massive MIMO may be designed by considering a combination of AGC trigging and BBBF function.

In order to at least in part solve the above and other potential problems, embodiments of the present disclosure provide new mechanism to detect and signal triggering of the AGC. Further, the signaling of the triggering of the AGC is used to decide the processing in following beam forming. Based on this mechanism, the negative effects on the UL beam forming from the AGC function may be significantly reduced.

According to embodiments of the present disclosure, after a plurality of signals from a plurality of receiving antennas are obtained, the signals are grouped into two sets of signals (referred to as "a first set of signals" and "a second set of signals," respectively) depending on whether or not to enable the AGC for these signals. That is, by the grouping, the signals from the receiving antennas are divided into different groups. If the AGC has been enabled for a signal, the signal is grouped into the second set of signals. Then, the AGC-disabled signals are grouped into the first set of signals. Next, for the beam forming associated with the receiving antennas, beam weights are determined by applying two different set of signal weights (referred to as "a first set of signal weights" and "a second set of signal weights," respectively) to the first and second sets of signals. The signal weights for the first set of signals are greater than the signal weights for the second set of signals. Principles and implementations of the present disclosure will be described in detail below with reference to FIG. 4 which shows a diagram of an example communication device 400 in accordance with some embodiments of the present disclosure.

As shown, the communication device 400 comprises a plurality of receiving antennas 410, a radio front end 420, an Orthogonal Frequency Division Multiplexing (OFDM) Fast Fourier Transform (FFT) module 430, a beam weight calculation module 440, a digital beam forming module 450, and a demodulator 460. Each of the receiving antennas 410 may receive a signal having an amplitude value and a phase. The signals received from the receiving antennas 410 are transferred to the radio front end 420 which implements related RF processing. A structure of the radio front end 420 is similar to that of the radio front end 100 as shown in FIG. 1. For the purpose of simplification, the details of the structure of the radio front end 420 will be omitted. Similar to the radio front end 100, the RF processing of the radio front end 420 also involves the AGC processing.

The signals outputted from the radio front end 420 are transferred to the OFDM FFT module 430 and transformed from the time domain to the frequency domain therein. Then, the signals in the frequency domain are used in the beam weight calculation module 440 to determine beam weights for the beam forming in the digital beam forming module 450. The beam weight calculation module 440 and the digital beam forming module 450 cooperate to implement the beam forming associated with the receiving antennas 410. The operations of the two modules 440 and 450 are known in the art, and the details thereof will be omitted. After the beam forming, the signals are demodulated in the demodulator 460.

It is to be understood that the components included in the communication device 400 may be implemented in various manners, including software, hardware, firmware, or any combination thereof.

As described above, for the signal received from one of the receiving antennas 410, if the AGC is triggered, the glitches may be induced into the gain of the signal. These glitches may degrade the performance of the subsequent beam forming implemented in the beam weight calculation module 440 and the digital beam forming module 450.

According to embodiments of the present disclosure, the digital beam forming may be implemented under the consideration of the triggering of the AGC. As shown, in this example, the beam weight calculation module 440 is coupled to the radio front end 420, and therefore the information on a triggering of the AGC may be fed into the beam weight calculation module 440 from the radio front end 420. Then, the signals from the antennas 410 are grouped into the first or second set of signals based on the information.

The information may be implemented in any suitable form. In some embodiments, an indication of the triggering of the AGC may act as the information and be transmitted from the radio front end 420 to the beam weight calculation module 440. Accordingly, if the triggering of the AGC is detected for a given signal, the given signal is grouped into the second set of signals. Otherwise, the given signal is grouped into the first set of signals.

In some other embodiments, the radio front end 420 may measure the power levels of the signals from the receiving antennas 410, for example, via power meters therein. Then, the power levels may be transmitted from the radio front end 420 to the beam weight calculation module 440. As described above, if the power level exceeds a threshold, the AGC function may be implemented for the corresponding signal. That is, the power level exceeding the threshold may indicate the triggering of the AGC. In this case, the power level may act as the information and implicitly indicate the triggering of the AGC for a given signal. Accordingly, the beam weight calculation module 440 may determine which set of signals the given signal is grouped into.

It is to be understood that in addition to the feeding of the information from the radio front end 420 to the beam weight calculation module 440, other implementations of the feeding may be possible. For example, the communication device 400 may also include a processor (not shown) which may gather the information on the triggering of the AGC, for example, from the radio front end 420. Then, the beam weight calculation module 440 may obtain the information from the processor.

Upon the grouping of the signals, in determining the beam weights, the beam weight calculation module 440 applies larger signal weights to the first set of signals and applies smaller signal weights to the second set of signal weights. In some embodiments, the signal weights for the second set of signals may be set to zero. In other words, the beam weight calculation module 440 removes the signal weights for the corresponding antenna branches. In this way, the negative influences of the AGC may be removed with the knowledge of the triggering of the AGC for the antenna branches. Accordingly, the overall weights for beam forming can remove the effect on the further processing due to the noises in the trigged branches.

In the embodiments where the effected antennas are removed in the determination of the beaming weights, the beam forming may be expressed as the following equation (2):

$$\tilde{y}_{B \times 1}^{(k)} = W_{B \times T'}^{(k)} \cdot y_{T' \times 1}^{(k)} \quad (2)$$

Figure 5:
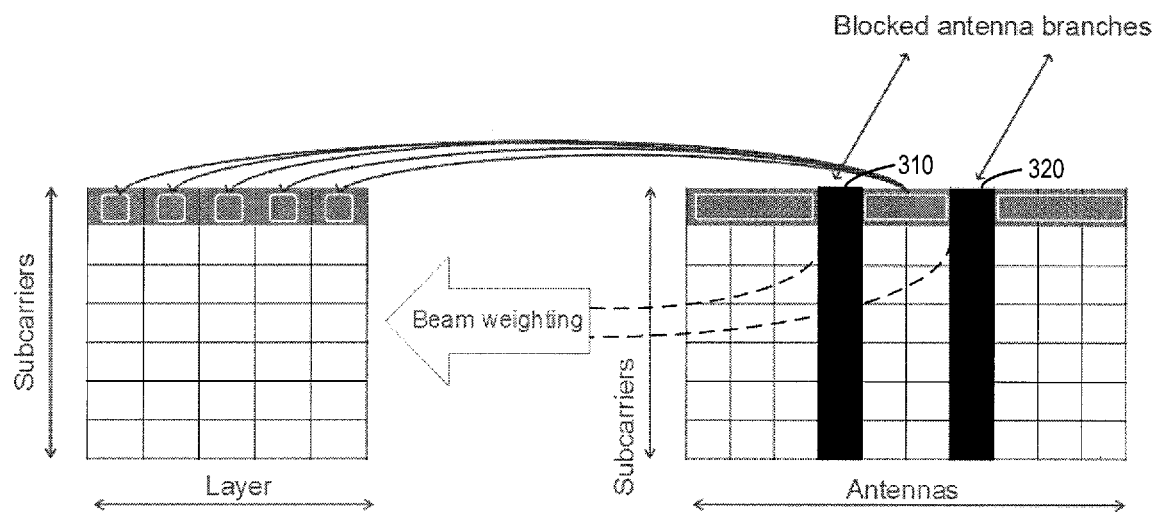
FIG. 5 shows elimination of the AGC impact from the beam forming.

Different from the equation (1), the beam weighs $W_{B \times T'}^{(k)}$ are determined based on the signals from the AGC-disabled antennas. Accordingly, the effects of the AGC may be eliminated from the beam forming. As shown in FIG. 5, if the AGC has been triggered for the antennas 310 and 320, the AGC impact will not be transferred into the beam forming by blocking the antennas 310 and 320.

According to embodiments of the present disclosure, the information on the triggering of the AGC may be transparently transferred to the beam weight calculation module 440 and further used by the beam weight calculation module 440 to improve the beam forming performance. For example, errors or glitches caused by the AGC adjustment may not be further fed into the following demodulator 460.

In addition, according to embodiments of the present disclosure, the suppression of the glitches caused by the AGC may be left out. Accordingly, for the Massive MIMO, the cost of components may be lower, and the time latency may be reduced.

In some embodiments, in order to keep a feedback attenuation mechanism with low complexity, the radio front end 420 may include only one or two attenuators (not shown) and one or two corresponding AGC states. In this way, the conventional AGC function is simplified with less number of states. The simplified AGC function may provide necessary protection to avoid the receiver hardware to be broken.

In some embodiments, in the radio front end 420, only one signal flow from the power meter to the beam weight calculation module 440 in the spatial processing function may be retained, and all legacy AGC related functions may be removed. In this way, the radio branch is totally blocked, and a slow recovery time is needed when the blocker appears and disappears. Moreover, in this case, the massive MIMO is not sensitive to the recovery time because the used branches are still enough for achieving enough signal to interference plus noise ratio (SINR) in receiving operations.

In the embodiments where the legacy AGC related functions are removed, the components for the legacy AGC related functions may be retained and allocated in the proper position of the whole receiver chain. Accordingly, the hardware damage may be avoided.

Figure 4:
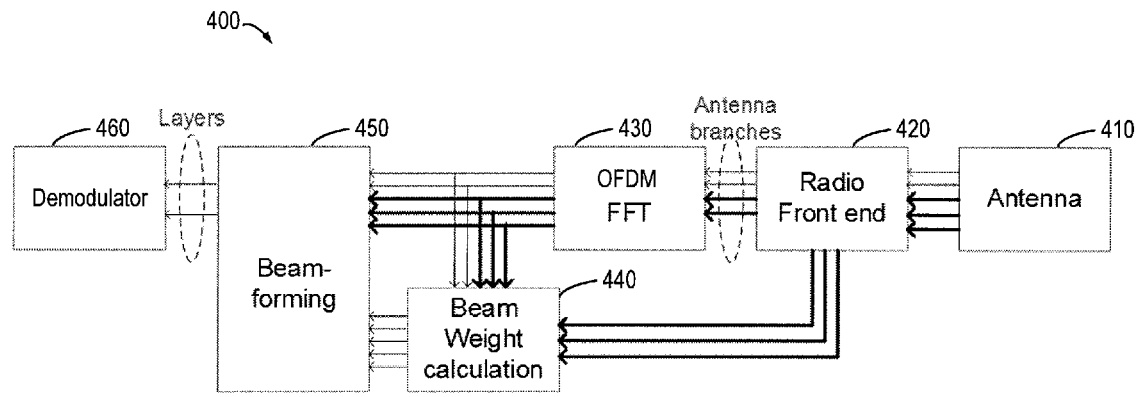
FIG. 4 shows a diagram of an example communication device in accordance with some embodiments of the present disclosure.

FIG. 6 shows a flowchart of an example method 600 in accordance with some other embodiments of the present disclosure. The method 600 can be implemented, for example, at the beam weights calculation module 440 in the communication device 400 as shown in FIG. 4.

At block 605, a plurality of signals from a plurality of receiving antennas are obtained. At block 610, the plurality of signals are grouped into a first set of signals and a second set of signals. The AGC is disabled for each signal in the second set of signals, and the AGC has been enabled for each signal in the second set of signals. At block 615, for beam forming associated with the plurality of receiving antennas, beam weights are determined by applying a first set of signal weights to the first set of signals and applying a second set of signal weights to the second set of signals. The first set of signal weights are greater than the second set of signal weights.

In some embodiments, for a given signal from the plurality of signals, an indication of a triggering of the AGC for the given signal may be detected. If the triggering of the AGC is detected, the given signal may be grouped into the second set of signals.

In some embodiments, for the given signal, a power level associated with the given signal may be obtained. If the power level exceeds a threshold, the given signal may be grouped into the second set of signals.

In some embodiments, each of the plurality of signals is obtained from one of the plurality of receiving antennas.

It is to be understood that all operations and features related to the beam weights calculation module 440 described above with reference to FIGS. 4 and 5 are likewise applicable to the method 600 and have similar effects. For the purpose of simplification, the details will be omitted.

FIG. 7 shows a block diagram of a communication device 700 in accordance with some embodiments of the present disclosure. The communication device 700 can be considered as an example implementation of the communication device 400 as shown in FIG. 4.

As shown, the communication device 700 includes: a first obtaining unit 705 configured to obtain a plurality of signals from a plurality of receiving antennas; a first grouping unit 710 configured to group the plurality of signals into a first set of signals and a second set of signals, wherein an automatic gain control (AGC) is disabled for each signal in the first set of signals, and the AGC is enabled for each signal in the second set of signals; and a determining unit 715 configured to determine beam weights for beam forming associated with the plurality of receiving antennas by applying a first set of signal weights to the first set of signals and applying a second set of signal weights to the second set of signals, wherein the first set of signal weights are greater than the second set of signal weights.

In some embodiments, the first grouping unit 710 may include: a detecting unit configured to, detect, for a given signal from the plurality of signals, an indication of a triggering of the AGC for the given signal; and a second grouping unit configured to, in response to the triggering of the AGC being detected, group the given signal into the second set of signals.

In some embodiments, the first grouping unit 710 may include: a second obtaining unit configured to obtain, for a given signal from the plurality of signals, a power level associated with the given signal; and a third grouping unit configured to, in response to the power level exceeding a threshold, group the given signal into the second set of signals.

In some embodiments, the first obtaining unit 705 may include: a third obtaining unit configured to obtain one of the plurality of signals from each of the plurality of receiving antennas.

It should be appreciated that units included in the communication device 700 correspond to the blocks of the method 600. Therefore, all operations and features described above with reference to FIGS. 4 to 6 are likewise applicable to the units included in the communication device 700 and have similar effects. For the purpose of simplification, the details will be omitted.

Other implementations of the communication device 700 are possible. In some embodiments, the communication device 700 may comprise: means for obtaining a plurality of signals from a plurality of receiving antennas; means for grouping the plurality of signals into a first set of signals and a second set of signals, wherein an automatic gain control (AGC) is disabled for each signal in the first set of signals, and the AGC has been enabled for each signal in the second set of signals; and means for determining beam weights for beam forming associated with the plurality of receiving antennas by applying a first set of signal weights to the first set of signals and applying a second set of signal weights to the second set of signals, wherein the first set of signal weights are greater than the second set of signal weights.

In some embodiments, the means for grouping the plurality of signals into the first set of signals and the second set of signals may comprise: means for detecting an indication of a triggering of the AGC for a given signal from the plurality of signals; and means for, in response to the triggering of the AGC being detected, grouping the given signal into the second set of signals.

In some embodiments, the means for grouping the plurality of signals into the first set of signals and the second set of signals may comprise: means for obtaining a power level associated with the given signal from the plurality of signals; and means for, in response to the power level exceeding a threshold, grouping the given signal into the second set of signals.

In some embodiments, the means for obtaining a plurality of signals from a plurality of receiving antennas may comprise: means for obtaining one of the plurality of signals from each of the plurality of receiving antennas.

The units or means included in the communication device 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the communication device 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

FIG. 8 is a simplified block diagram of a device 800 that is suitable for implementing embodiments of the present disclosure. The device 800 can be implemented at or as at least a part of the communication device 400 as shown in FIG. 4.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 820 stores at least a part of a program 830. The TX/RX 840 is for bidirectional communications. The TX/RX 840 has at least one antenna to facilitate communication. The communication interface may represent any interface that is necessary for communication with other network elements, such as X2 interface for bidirectional communications between eNB s, S1 interface for communication between a Mobility Management Entity (MME)/Serving Gateway (S-GW) and the eNB, Un interface for communication between the eNB and a relay node (RN), or Uu interface for communication between the eNB and a communication device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to any of FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a communication device, comprising:
    obtaining at least one of a plurality of signals from each of a plurality of receiving antennas;
    grouping the obtained signals into a first set of signals and a second set of signals based on whether to enable or disable an automatic gain control (AGC) for the obtained signals, wherein the AGC is disabled for each signal in the first set of signals, and wherein the AGC is enabled for each signal in the second set of signals; and
    determining beam weights for beam forming associated with the plurality of receiving antennas by applying a first set of signal weights to the first set of signals and applying a second set of signal weights to the second set of signals, wherein the first set of signal weights are greater than the second set of signal weights.

2. The method of claim 1, wherein grouping the obtained signals into the first set of signals and the second set of signals comprises:
    for a given signal from the obtained signals,
        detecting an indication of a triggering of the AGC for the given signal; and
        in response to the triggering of the AGC being detected, grouping the given signal into the second set of signals.

3. The method of claim 1, wherein grouping the obtained signals into the first set of signals and the second set of signals comprises:
    for a given signal from the obtained signals,
        obtaining a power level associated with the given signal; and
        in response to the power level exceeding a threshold, grouping the given signal into the second set of signals.

4. The method of claim 1, wherein obtaining the at least one of the plurality of signals from each of the plurality of receiving antennas comprises:
    obtaining one of the plurality of signals from each of the plurality of receiving antennas.

5. A communication device comprising a processor, wherein the processor is configured to:
    obtain at least one of a plurality of signals from each of a plurality of receiving antennas;
    group the obtained signals into a first set of signals and a second set of signals based on whether to enable or disable an automatic gain control (AGC) for the obtained signals, wherein the AGC is disabled for each signal in the first set of signals, and wherein the AGC is enabled for each signal in the second set of signals; and
    determine beam weights for beam forming associated with the plurality of receiving antennas by applying a first set of signal weights to the first set of signals and applying a second set of signal weights to the second set of signals, wherein the first set of signal weights are greater than the second set of signal weights.

6. The communication device of claim 5, wherein to group the obtained signals into the first set of signals and the second set of signals, the processor is configured to:
    for a given signal from the obtained signals,
        detect an indication of a triggering of the AGC for the given signal; and
        in response to the triggering of the AGC being detected, group the given signal into the second set of signals.

7. The communication device of claim 5, wherein to group the obtained signals into the first set of signals and the second set of signals, the processor is configured to:
    for a given signal from the obtained signals,
        obtain a power level associated with the given signal; and
        in response to the power level exceeding a threshold, group the given signal into the second set of signals.

8. The communication device of claim 5, wherein to obtain the at least one of the plurality of signals from each of the plurality of receiving antennas, the processor is configured to:
   obtain one of the plurality of signals from each of the plurality of receiving antennas.

9. An apparatus at a communication device, comprising:
   a processor and memory, the memory containing instructions executable by the processor whereby the apparatus is operative to:
   obtain at least one of a plurality of signals from each of a plurality of receiving antennas;
   group the obtained signals into a first set of signals and a second set of signals based on whether to enable or disable an automatic gain control (AGC) for the obtained signals, wherein the AGC is disabled for each signal in the first set of signals, and wherein the AGC is enabled for each signal in the second set of signals; and
   determine beam weights for beam forming associated with the plurality of receiving antennas by applying a first set of signal weights to the first set of signals and applying a second set of signal weights to the second set of signals, wherein the first set of signal weights are greater than the second set of signal weights.

10. The apparatus of claim 9, wherein grouping the obtained signals into the first set of signals and the second set of signals comprises:
    for a given signal from the obtained signals,
    detecting an indication of a triggering of the AGC for the given signal; and
    in response to the triggering of the AGC being detected, grouping the given signal into the second set of signals.

11. The apparatus of claim 9, wherein grouping the obtained signals into the first set of signals and the second set of signals comprises:
    for a given signal from the obtained signals,
    obtaining a power level associated with the given signal; and
    in response to the power level exceeding a threshold, grouping the given signal into the second set of signals.

12. The apparatus of claim 9, wherein obtaining the at least one of the plurality of signals from each of the plurality of receiving antennas comprises:
    obtaining one of the plurality of signals from each of the plurality of receiving antennas.

* * * * *